Jan. 30, 1968   P. E. GOSTLING   3,366,361
ADJUSTABLE STRUTS APPLICABLE TO BUILDING CONSTRUCTION
Filed Aug. 26, 1966   2 Sheets-Sheet 1

Inventor
Peter Eric Gostling
By Lucke & Lucke

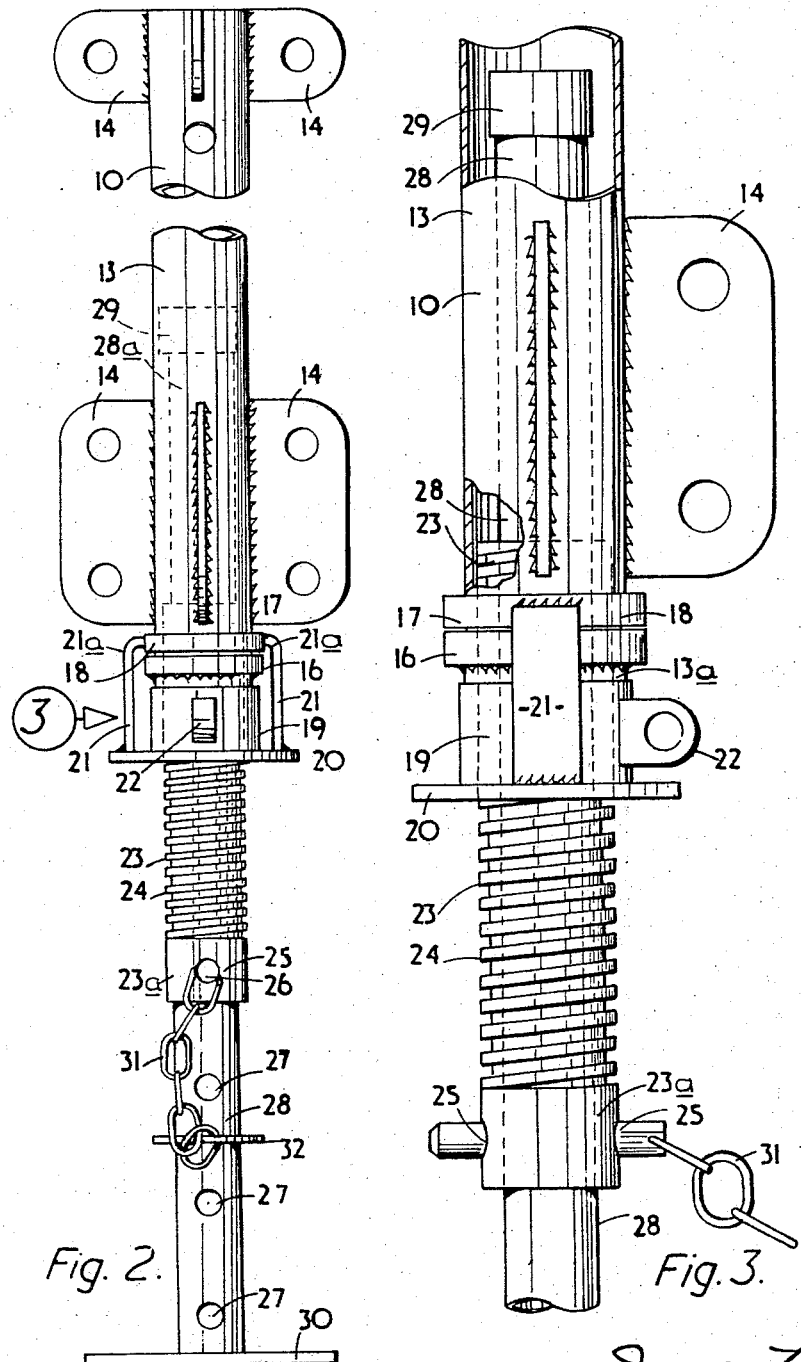

United States Patent Office 3,366,361
Patented Jan. 30, 1968

3,366,361
ADJUSTABLE STRUTS APPLICABLE TO
BUILDING CONSTRUCTION
Peter Eric Gostling, Coleshill, England, assignor to Kwik-form Limited, Birmingham, England, a British Company
Filed Aug. 26, 1966, Ser. No. 575,321
Claims priority, application Great Britain,
Sept. 3, 1965, 37,718/65
3 Claims. (Cl. 248—354)

This invention relates to adjustable struts such as are used in building construction as well as being applicable to struts for other purposes. The invention is concerned with adjustable struts which may be used alone as well as where they form part of scaffolding which in use is required to be transported, for example, in the case of the scaffolding framework for supporting shuttering elements, which framework is more particularly described in the specification of our co-pending patent application No. 578,116.

The present invention has for its object the provision of an adjustable strut in which the various parts of the strut are effectively held against separation from one another when the strut or the scaffolding, of which it forms a part, is being transported or maneuvered on the building site.

An adjustable strut in accordance with this invention comprises an outer tube, a collar of peripheral diameter greater than that of said tube and connected rigidly to one end of said tube, a ring in rotatable engagement with that end face of the collar which is directed away from said one end of the tube, a nut disposed adjacent to the collar beyond that end thereof which is furthest from the ring, means connecting the nut to the ring to rotate therewith around the axis of the outer tube, a second tube having a peripheral screw thread in engagement with the nut, a coarse adjustment extension tube axially slidable within the second screw threaded tube, means for securing the extension tube in a number of different axial positions relative to the screw threaded tube, and means for retaining the extention tube against outward disengaging movement from the screw threaded tube.

In such an arrangement, the means for securing the extension tube in a number of different axial positions relative to the screw threaded tube provide for a course adjustment in the overall length of the strut; and a fine adjustment in the overall length of the strut is provided by the screw threaded connection between the nut and the peripherally screw threaded second tube.

Preferably, the nut is mounted on or is provided with a flange rotatable with the nut, which flange is of a peripheral diameter greater than that of the nut and is disposed at that end face of the nut which is furthest from the ring and the means connecting the nut to the ring preferably comprise a plurality of axially extending arms disposed beyond the outer periphery of the collar and spaced relatively apart to accommodate an eye or other turning portion on the nut engageable with a suitable tool.

The invention is illustrated in the accompanying drawings, wherein:

FIGURE 2 is a side elevation to an enlarged scale of one of the adjustable struts depicted in FIGURE 1, part of the outer tube of the adjustable strut being omitted.

FIGURE 3 is a side elevation looking in the direction of the arrow 3 of FIGURE 2 and depicting to an enlarged scale part of the same adjustable strut, certain portions being broken away for clarity.

Figure 1:
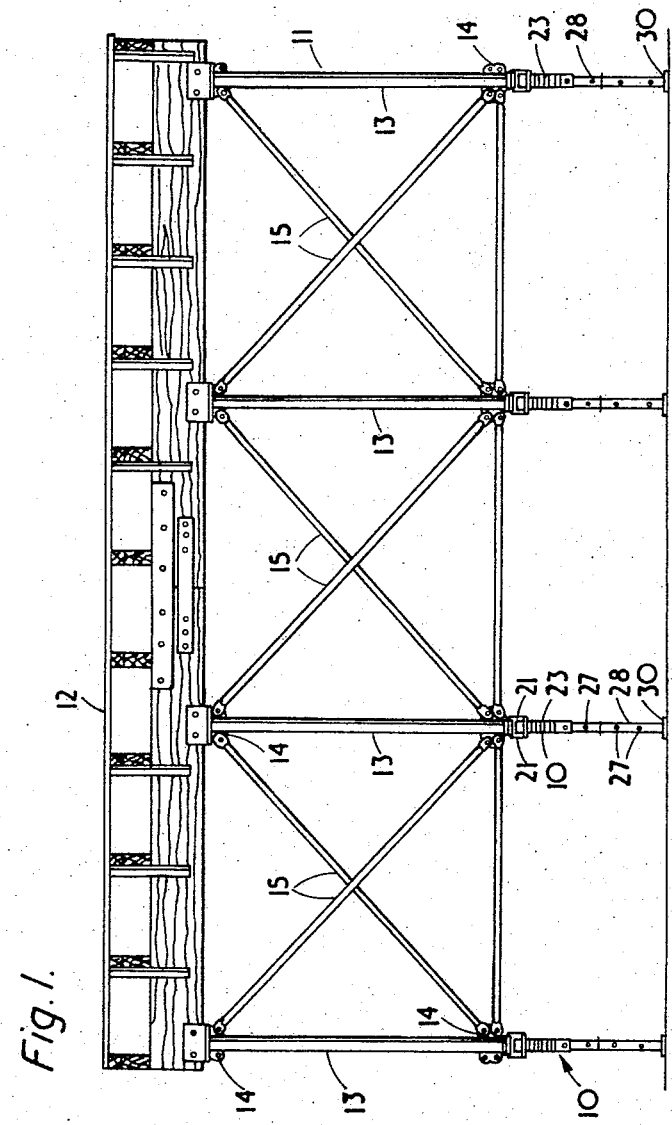
FIGURE 1 is a side elevation of one form of scaffolding framework for supporting shuttering elements, which framework embodies a plurality of adjustable struts incorporating one embodiment of this invention.

Referring to the drawings, the adjustable struts, a plurality of which are illustrated at 10, each provide one of the upright members of a scaffolding framework 11 which serves to support a shuttering element 12, and which framework is constructed as more particularly described in the co-pending specification above mentioned.

Each of these struts 10 comprises an upper and outer tube 13 constituting one of the upright members of the framework 11, the tube 13 at its upper and lower ends having welded to its exterior a number of radially extending circumferentially spaced lugs 14 in the form of metal plates, the planes of which all lie parallel to the longitudinal i.e. vertical axis of the tube 13.

These lugs 14 serve through horizontal and/or diagonal bracing 15 to connect the upright members of the framework together in horizontally spaced relationship.

The lower end of each of the outer tubes 13 of the struts 10 has welded thereto a collar 16 of diameter greater than the peripheral diameter of the tube 13 so as to provide an upwardly directed shoulder face 17 which supports for rotation about the axis of the tube 13, a ring 18 disposed between the collar and the adjacent lugs 14 so that the ring 18 is located against appreciable axial movement in relation to the outer tube in addition to being prevented from dropping off the lower end of the tube 13 by the presence of the collar.

Immediately below the lower end of the tube 13 is a nut 19 which may be in rotatable engagement with the adjacent end face of the collar 16, but preferably as shown is in rotatable engagement with the adjacent end face 13a of the tube 13 which projects a short distance below the collar 16 so as to provide a space in which welding metal can be applied to the lower face of the collar to secure this to the tube 13 without interfering with the free rotation of the nut 19 and leaving the upper face 17 of the collar free from irregularities so that the ring 18 can be supported therefrom for rotatable engagement thereon.

The lower end face of the nut 19 is connected e.g. by welding to a flange 20 to rotate therewith, which flange 20 is of a peripheral diameter larger than that of the nut, and between the flange 20 and the ring 18 extend axially of the tube a pair of strip metal arms 21 spaced diametrically on opposite sides of the nut 19.

Each of these arms 21 is straight except at its upper end 21a with the lower end face of each arm welded to the upper face of the flange 20. The upper end 21a of each arm 21 is bent inwardly, with the end face of the inwardly bent part welded to the outer periphery of the ring 18.

To enable the ring 18 to be positioned on the outer tube, after the collar has been welded thereto, the ring 18 is made in two semi-circular halves which are connected together by the weld which secures the ring 18 to the upper end 21a of each of the two arms.

The nut 19 at a position intermediate the two spaced apart arms 21 is provided with an outwardly projecting turning eye 22, whereby the nut can be turned by a tommy-bar or other suitable tool.

Within the nut 19 is a second peripherally screw-threaded tube 23, the screw thread 24 of which as well as that of the nut 19 is preferably of square or buttress form, with the screw thread 24 extending over the whole length of the second tube 23 except the lower end 23a which is of plain configuration of the same diameter as that of the threaded part of the tube. This lower plain portion 23a is formed with a pair of diametrically opposed holes 25 adapted to receive a removable locking pin 26 which in the known manner can be inserted also through any one of a number of axially spaced diametrical opposed holes 27 in an extension tube 28 which is disposed within the screw threaded tube 23 so as to be slidable axially thereof. Thus a coarse adjustment in the overall length of the strut can be provided in the known manner; a fine adjustmentt being provided by the nut 19 and screw threaded tube 23.

The extension tube 28 is made of a length substantially greater than that of the screw threaded tube 23, so that both ends thereof project axially beyond the corresponding ends of the screw threaded tube, and the so projecting upper end 28a of the extension tube has secured thereto a retaining washer 29 of peripheral diameter slightly less than the base diameter of the screw thread 24 so as to be of diameter less than the bore of nut 19 but greater than the bore of tube 23. Accordingly the retaining washer 29 prevents the extension tube 28 from sliding out of the screw threaded tube 23 when the strut is lifted in a substantially vertical position clear of the ground or equivalent external support.

The lower end of the extension tube has secured thereto a ground engaging base plate 30 of conventional form.

The removable locking pin 26 may be made captive by connecting it to one end of a short length of chain 31, the other end of which is connected to a ring 32 which extends freely around the lower part of the extension tube 28.

With the present invention it will be understood that when the strut 10 or a number of struts 10 embodied in a scaffolding framework 11 as above described, are disposed in a vertical or near vertical position and lifted clear of the ground or other supporting surface therebeneath, there is no possibility of either of the extension tube 28 or the screw threaded tube 23 becoming detached either from one another or from the outer tube 13 by dropping therefrom once the parts have been assembled together in the manner above described. Thus the present invention is particularly applicable to scaffolding framework as described more particularly in the co-pending specification referred to in the opening paragraph of this specification and which is required to be elevated clear of the ground by means of a tower or other crane as described in such co-pending specification.

The construction described herein is however such that in the event of the screw thread 24 on the exterior of the screw threaded tube 23 having become worn or damaged, it is possible to separate this together with the extension tube 28 from the outer tube 13 by merely turning the nut 19 to screw the screw threaded tube 23 downwardly to the fullest extent until it disengages from the nut 19, whereupon the screw threaded tube 23 together with the extension tube 28 can be withdrawn completely from the outer tube 13, the bore of which for the foregoing purpose is made greater than the diameter of the retaining washer 29 on the upper end of the extension tube 28.

What I claim then is:

1. An adjustable strut comprising an outer tube, a collar of peripheral diameter greater than that of said tube and connected rigidly to one end of said tube, a ring in rotatable engagement with that end face of the collar which is directed away from said one end of the tube, a nut disposed adjacent to the collar beyond that end thereof which is furthest from the ring, means connecting the nut to the ring to rotate therewith around the axis of the outer tube, a second tube having a peripheral screw thread in engagement with the nut, a coarse adjustment extension tube axially slidable within the second screw threaded tube, means for securing the extension tube in a number of different axial positions relative to the screw threaded tube, and means for retaining the extension tube against outward disengaging movement from the screw threaded tube.

2. An adjustable strut according to claim 1 wherein the nut is provided with a flange to rotate with the nut, which flange is of a diameter greater than that of the nut and disposed at the end face of the nut which is furthest from the ring, to which ring the nut is connected by a plurality of axially extending arms disposed beyond the outer periphery of the collar and spaced relatively apart to accommodate an eye or other turning portion on the nut engageable with a suitable tool.

3. An adjustable strut according to claim 1 or 2, wherein the means for retaining the extension tube against outward disengaging movement from the screw threaded tube comprise forming the extension tube to such a length greater than that of the screw threaded tube, that the inner end of the extension tube projects beyond the adjacent end of the screw threaded tube, the inner end of the extension tube being provided with a peripheral washer adapted for retaining engagement with the adjacent end of the screw threaded tube, said washer having a peripheral diameter less than the respective bores of the outer tube and of the nut so as to permit of the extension tube together with the screw threaded tube being withdrawn completely from the outer tube by unscrewing the screw threaded tube completely from the nut on the outer tube.

References Cited

UNITED STATES PATENTS

| 2,532,168 | 11/1950 | Jakoubek | 248—354 |
| 2,687,268 | 8/1954 | Hawes | 248—354 |

FOREIGN PATENTS

| 572,421 | 11/1958 | Belgium. |
| 859,065 | 5/1940 | France. |

ROY D. FRAZIER, *Primary Examiner.*

FRANK DOMOTOR, *Assistant Examiner.*